2,899,580
ELECTRON TUBE

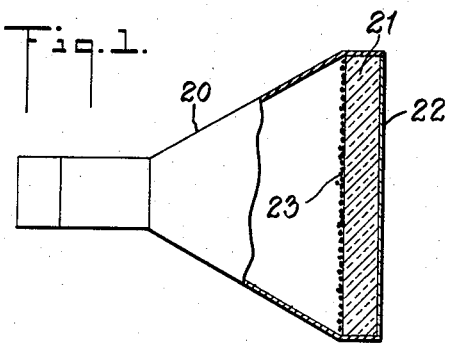
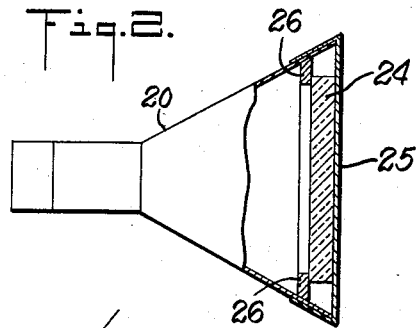
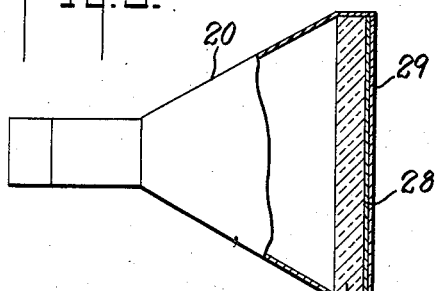
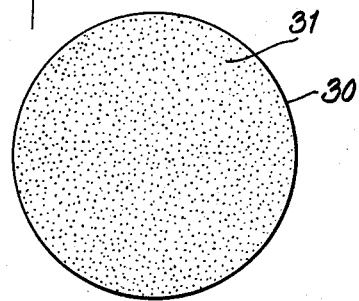
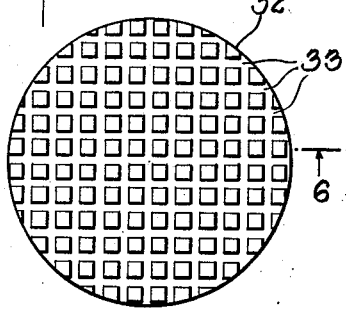
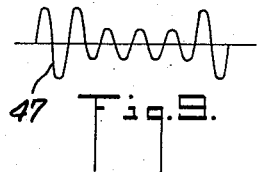
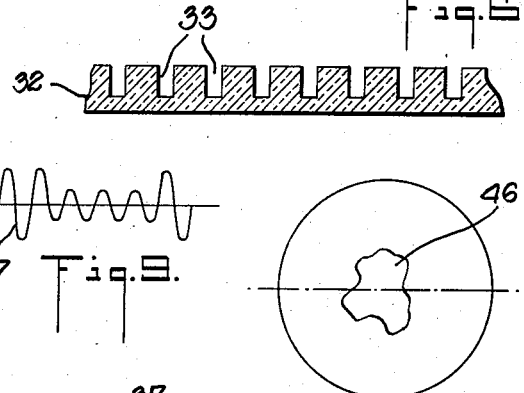
INVENTOR.
ABRAHAM I. DRANETZ
WALTER WELKOWITZ
BY
ATTORNEY

Abraham I. Dranetz and Walter Welkowitz, Metuchen, N.J., assignors to Gulton Industries, Inc., Metuchen, N.J., a corporation of New Jersey Application October 4, 1955, Serial No. 538,481

1 Claim. (Cl. 313—89)

Our invention relates to electron tubes and in particular to electron tubes having a pressure sensitive face which is piezoelectric or wherein a pressure sensitive piezoelectric device is attached to the inner surface of the face of the tube, whereby it is possible to obtain a visual display of ultrasonic phenomena.

It has been found that the various transmission characteristics of ultrasonic waves in a material such as absorption, refraction and reflection may be utilized to detect flaws or non-homogeneities in the material. Up to now, it has not been feasible or economical to visually display these flaws or non-homogeneities which are detected by ultrasound.

Visual display of ultrasonic phenomena may also be employed for comparison studies wherein the ultrasonic transmission characteristics of an unknown material are compared with those of various known materials, thereby enabling the user to determine the composition of the unknown material.

To date, virtually all methods commonly employed for ultrasonic inspection utilize one or, at most, a few ultrasonic receiving elements each of which covers only a small segment of area. In order to examine a large area, it is necessary to employ a mechanical scanning system which is uneconomical, cumbersome and time-consuming. Two dimensional visual presentations have been obtained by the employment of phosphorescent materials which are sensitive to sonic radiation or by the employment of odd shaped particles suspended in a liquid. However, none of these ultrasonic visual display techniques are useful for the essentially instantaneous study of a substantial area.

Accordingly, it is a principal object of our invention to provide a device which converts ultrasonic pressures to electrical signals which may be employed to display visual shadowgraphs of the ultrasonic energy impinged upon the surface of the device.

It is a further object of our invention to provide a device which may be utilized to display flaws and non-homogeneities in materials visually.

Other objects and advantages of our invention will be apparent during the course of the following description.

In the accompanying drawings forming a part of this application, and in which like numerals are employed to designate like parts throughout the same, Figure 1 is a view, partly in cross-section, of an embodiment of our invention wherein a conductive electrode is applied to the outer face of the piezoelectric element and a mosaic of conductive electrodes is applied to the inner face of the piezoelectric element, Figure 2 is a view, partly in cross-section, of a further embodiment of our invention wherein a metal face is pressed against the outer face of the piezoelectric element and the metal face is sealed to the tube envelope, Figure 3 is a view, partly in cross-section, of a still further embodiment of our invention wherein a thin glaze is applied to the outer face of the piezoelectric element, Figure 4 is a plan view of a still further embodiment of the piezoelectric element of our invention wherein a mosaic of ceramic is embedded in a metallic base, Figure 5 is a plan view of a still further embodiment of the piezoelectric element of our invention wherein one of the surfaces of the piezoelectric element is divided into a mosaic of individual units by slots, Figure 6 is an expanded cross-sectional view along the line 6—6 of Figure 5, Figure 7 is a view, partly diagrammatic and partly in section, illustrating a preferred use of the devices of our invention, Figure 8 is a typical shadowgraph view obtained when using devices of our invention, and Figure 9 is the typical ultrasonic wave form along one scanned line of the shadowgraph of Figure 8.

In the drawings, wherein for the purpose of illustration, are shown preferred embodiments of our invention, the numeral 20 designates the tube envelope, numeral 21 designates the piezoelectric face, electrode 22 is applied to the outer surface of 21 and conductive electrodes 23 are applied to the inner surface of 21. Piezoelectric face 24 is supported between ring 26 and metallic plate 25. The outer surface of piezoelectric face 27 is covered by electrode 28 and glaze 29. Metallic base 30 has imbedded in it a mosaic of piezoelectric elements 31. Slits 33 are cut in piezoelectric 32. Ultrasonic generator 34 excites transducer 35 which is mounted inside tank 36. The material 38 which is under study is suspended in liquid 37. Tube 39 is a device produced in accordance with our invention and is mounted in the wall of 36 opposite transducer 35. Deflection circuits 40 control the scanning of the face of 39 whose output is fed across output network 41 to amplifier 42. The output of 42 is fed to monitor tube 45. Synchronizing circuits 43 keep deflection circuits 40 and 44 in step, 44 being utilized to control the scanning of the face of monitor tube 45. The numeral 46 designates the ultrasonic waveform along the scanned line of Figure 8.

Devices produced in accordance with our invention may be utilized for the observation and study of flaws and non-homogeneities in materials as well as for the study and examination of tissue in various medical applications. The field of medical diagnosis presently utilizes ultrasonic techniques which will be materially helped by the use of devices of our invention.

The embodiment of Figure 1 is comprised of an electron gun contained in a glass or metallic envelope 20 in the usual manner and piezoelectric face 21 with outer electrode 22 and inner electrode "bits" 23. 21 is sealed within 20 so that the unit may be properly evacuated. If 21 is a ceramic which may be polarized, such as barium titanate, polarization may be accomplished after the tube has been sealed and evacuated. A preferred method of polarizing 21 comprises heating 21 above its transition temperature, applying a high potential to 22 and scanning 23 with an electron beam from the electron gun contained in 20 while 21 is cooled to a point below its transition temperature. Interlaced scanning should be used and most satisfactory polarization will be attained if the interlace is random. Polarization can also be assomplished before the gun is sealed in the tube but after the bulb and front face are fabricated by employing the usual oil immersion method in conjunction with cooling through the transistion temperature.

Other piezoelectric tube faces may be employed in place of that of Figure 1. For example, that shown in Figure 2 comprises a piezoelectric plate 24 which is held against ring 26 by metal plate 25. Ring 26 is bonded or otherwise suitably attached to envelope 20 and metal plate 25 is sealed to envelope 20. Ring 26 should preferably be of the same material as 20, metal if 20 is metal and glass if 20 is glass. The conductive "bits" 23 may be placed on the inner surface of 24 and polarization of an artificially polarizable material such as barium titanate may be accomplished in the same manner as heretofore described for 21. Polarization of 21 and 24 may also be accomplished if there is no conductive material on the inner surface of the polarizable piezoelectric face by the same method as that described for faces with conductive "bits" 23.

Other embodiments of tube faces of our invention are illustrated in Figures 3, 4 and 5. In Figure 3, electrode 28 is applied to piezoelectric plate 27 and glaze 29 is applied over 28. Then the entire assembly is sealed in envelope 20. Glaze 29 serves to prevent leaks and must be very thin so as to not impair the pressure sensitivity of 27. Polarization of 27 is accomplished by the methods previously described.

Figure 4 illustrates a mosaic of piezoelectric "bits" 31 imbedded in a thin metal plate 30. The face may be sealed to envelope 20 with the ceramic "bits" 31 facing in or out. If they face in, polarization may be accomplished as previously described and they may or may not be electroded as desired. If they face out, it is best that they be electroded and that polarization then be accomplished as previously described.

Figures 5 and 6 illustrate a further embodiment of our invention whereby a mosaic effect is obtained by cutting intersecting slits 33 on one face of ceramic 32. This has the effect of producing mechanical decoupling on the sides of the elemental piezoelectric "bits." By this technique, a plurality of independent individual piezoelectric units is fabricated from a single sheet of material.

Any of the electron tubes of our invention, hereinbefore described, may be utilized in the manner illustrated in Figure 7. This figure depicts, partly in cross-section and partly diagrammatically, a circuit and method for detecting flaws and non-homogeneities in materials or for the study and examination of biological material in medical research and diagnosis.

The material under observation 38 is suspended in liquid 37 and placed so that it is in the path of ultrasonic transmission between transducer 35 and electron tube 39. Transducer 35 is mounted inside tank 36 and is electrically excited by signals from ultrasonic generator 34. The face of electron tube 39 is pressure sensitive and retains individual charges on the small areas, in the case of the electrode "bit" embodiment, and continuously varying charge in the case of the unelectroded embodiment, the amount of such charge depending upon the intensity of the ultrasonic energy impinged on the individual areas. The charges are removed individually as the electron beam from the electron gun contained in 39 scans each separate piezoelectric area. The removal of the charge forms a pulse whose characteristics depend upon the amount of charge. This pulse appears in the output circuit 41 and is applied to the input of video amplifier 42. The output of video amplifier 42 is fed to cathode ray tube 45 on which there appears a light spot whose intensity is proportional to the original charge on the face of 39.

In order to insure that the spot appearing on the face of 45 be in the same relative position as the charge on the face of 39, it is necessary to synchronize the scanning or deflection circuits of both 39 and 45. This is accomplished by synchronizing deflection circuits 40 and 44. Synchronizing circuits 43 control deflection circuits 40 and 44 and thereby keep the scanning of 45 synchronized with that of 39.

Figure 8 illustrates a typical ultrasonic shadowgraph obtained by the methods of our invention and Figure 9 is a drawing of the ultrasonic wave amplitude of the scanned line of Figure 8 (shown as a horizontal section line).

By way of illustration but without limiting the scope of our invention, following is an example of the beam size and ultrasonic frequency which has been successfully attained with devices of our invention.

With a scanning and ultrasonic frequency of 1 megacycle, a scanning line length of 5 centimeters and a beam width of 0.5 mm., there are 100 beam widths per line. If the beam is to remain on each spot for an average of 4 cycles, or 4 microseconds, the sweep rate must be 2500 lines per second. For a resolution of 250 lines per frame, the frame rate should be 10 per second.

Other values of the parameters and greater definition and resolution may be obtained if desired. The example given will yield adequate readable shadowgraphs of flaws in metals and other materials and may also be used satisfactorily for biological tissue study in medical research and diagnosis.

We have found fabricating the face of our electron tube of artificially polarizable material such as barium titanate both with and without other compounds to be very satisfactory because of the high dielectric constant of these ferroelectric ceramics.

While we have described our invention by means of specific examples and in specific embodiments, we do not wish to be limited thereto, for obvious modifications will occur to those skilled in the art without departing from the spirit of the invention or the scope of the subjoined claim.

Having thus described our invention, we claim:

An electron tube comprising a tube envelope; an electromechanically sensitive body forming the face of said electron tube; and electron beam scanning means within said envelope; said electro-mechanically sensitive body being held in place by a ring within the envelope of said electron tube bearing on the edge of the inner face of said electro-mechanically sensitive body and a metallic plate bearing against the outer surface of said body, said plate being sealed to said envelope.

References Cited in the file of this patent

UNITED STATES PATENTS

| | | |
|---|---|---|
| 2,164,125 | Sokoloff | June 27, 1939 |
| 2,277,007 | Von Ardenne | Mar. 17, 1942 |
| 2,361,998 | Fleming-Williams | Nov. 7, 1944 |
| 2,640,165 | Howatt | May 26, 1953 |
| 2,716,708 | Bradfield | Aug. 30, 1955 |
| 2,793,288 | Pulvari | May 21, 1957 |